W. A. OWENS.
METHOD OF REPAIRING TURNED SHOES.
APPLICATION FILED AUG. 4, 1919.
Reissued Mar. 2, 1920.
14,811.
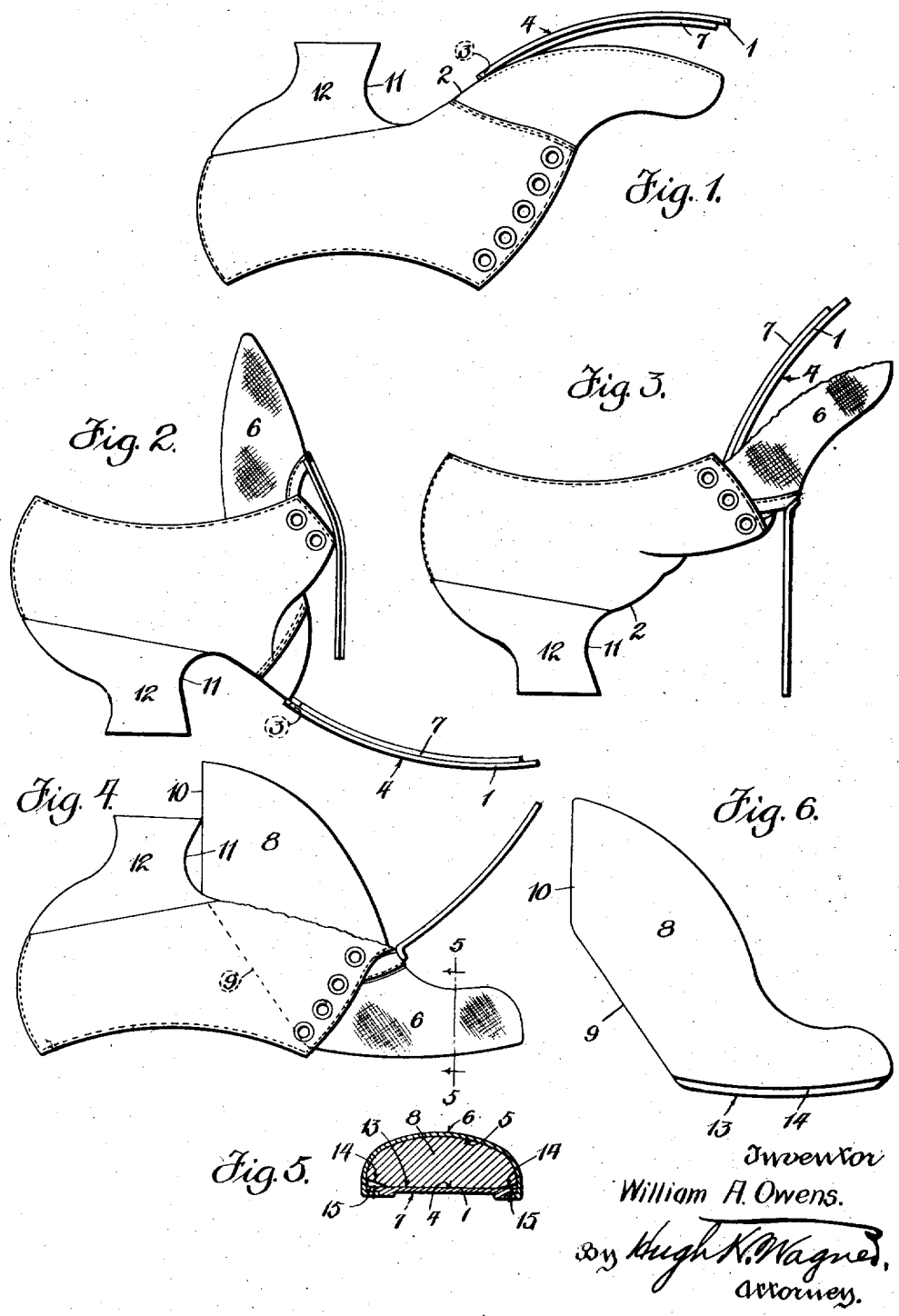
Inventor
William A. Owens.
By Hugh K. Wagner,
Attorney.

UNITED STATES PATENT OFFICE.

WILLIAM A. OWENS, OF ST. LOUIS, MISSOURI, ASSIGNOR OF ONE-HALF TO LUNGSTRAS DYEING & CLEANING COMPANY, OF ST. LOUIS, MISSOURI, A CORPORATION OF MISSOURI.

METHOD OF REPAIRING TURNED SHOES.

14,811. Specification of Reissued Letters Patent. Reissued Mar. 2, 1920.

Original No. 1,244,772, dated October 30, 1917, Serial No. 183,462, filed July 30, 1917. Application for reissue filed August 4, 1919. Serial No. 315,342.

*To all whom it may concern:*

Be it known that I, WILLIAM A. OWENS, a citizen of the United States of America, and a resident of the city of St. Louis, in the State of Missouri, have invented certain new and useful Improvements in Methods of Repairing Turned Shoes, of which the following is hereby declared to be a full, clear, and exact description, reference being had therein to the accompanying drawings.

This invention relates primarily to methods or processes for the repair of shoes, and has for its object the provision of a series of steps by which standard shoe-stitching machines may be employed to affix a new sole to what are technically known as "turned" shoes, in distinction to the slow and tedious method of hand-stitching, which is now followed in such work.

In the accompanying drawings, in which like numbers of reference denote like parts wherever they occur, Figure 1 represents a turned shoe with the new half-sole secured at one end to the shank of the shoe by a transverse row of small tacks;

Fig. 2 depicts the next step in the process, namely, the reversal of the vamp through the upper;

Fig. 3 depicts the third step, namely, the reversal of the sole in like manner;

Fig. 4 depicts the following step, namely, the insertion of a specially formed last;

Fig. 5 is a cross section taken along line 5—5 in Fig. 4; and

Fig. 6 is a side elevation of the said last.

Heretofore, the resoling of a pair of turned shoes (as distinguished from shoes made by the "welt" or "McKay" method) has required the outlay of considerable time and effort, due to the fact that the removal of the worn sole left the vamp entirely without support, so that the new sole could not be secured thereto by stitching machines, but only by the slow process of hand-stitching, which served materially to increase the cost of the repair.

As one experienced in the art of shoe manufacture and repair, I have sought to evolve a method whereby the resoling of such shoes could be accomplished as quickly and as economically as the resoling of welt or McKay shoes and without the aid of any machinery other than the standard appliance commonly known as an in-seamer.

In the practice of this invention, the worn sole is first removed from the vamp and the new sole 1 fastened to the shank 2 of the shoe by a transverse row of small tacks 3, the outer or wearing surface of the sole being indicated by 4 and the outer surface of the vamp being indicated by 5. Following this step, the vamp is turned inwardly behind the sole, as the parts appear in Fig. 1 of the drawings, forced upward between the upper, as shown in Fig. 2, and then pulled outwardly and completely reversed, so as to expose the lining 6, after which the sole is reversed in like manner, so as to bring its inner surface 7 uppermost, as shown in Fig. 3.

These steps, which constitute the essential steps of the method, having been carried out, means are provided for securing the parts in relative positions during the final stitching. Such means is here shown as a half-last 8, which is arranged within the vamp, as illustrated in Fig. 4, so that its inclined surface 9 lies substantially flush with the shank 2, and its upper squared end 10 may abut the inner surface 11 of the heel 12, and the material may or may not be tacked to the last. In either manner, the last is locked against displacement. By reference to Figs. 5 and 6 it will be seen that the sole or bottom 13 of the last 8 is sharply beveled, as at 14, so as to permit the insertion of the machine-driven needle by which the sole of the shoe is finally stitched to the vamp, as indicated at 15, although such machine-stitching is not absolutely necessary. Thereafter the vamp and sole are forced backward through the upper and thus reversed, so as to expose their wearing surfaces, the repair being then completed and the shoe ready for use.

Having thus fully described the method of my invention, I claim:

1. The method of resoling turned shoes or slippers consisting in initially securing the sole to the shank, only reversing that portion of the vamp forward of the breast line of the heel with the applied sole, and securing the sole in position while the parts are reversed.

2. The method of resoling turned shoes consisting in only reversing that portion of the vamp forward of the breast line of the heel with the sole, inserting means within the turned parts to hold them in proper relation for securing the sole in place, and securing the sole while the parts are in reversed positions.

3. The method of resoling turned shoes consisting in securing the sole to the shank of the shoe, only reversing that portion of the vamp forward of the breast line of the heel with the applied sole, and stitching the sole in position while the parts are reversed.

4. The method of resoling turned shoes and slippers which consists in first securing an extremity of the new sole to the shank of the shoe or slipper, next reversing the vamp and sole so as to expose the inner surfaces of these parts, then inserting a half-last between the heel of the shoe or slipper and the toe thereof, next securing the sole to the vamp by machine stitching, and finally reversing the sole and vamp so as to expose the wearing surfaces of these parts.

In testimony whereof, I have hereunto affixed my signature.

WILLIAM A. OWENS.